United States Patent [19]
Tsujino et al.

[11] Patent Number: 5,257,199
[45] Date of Patent: Oct. 26, 1993

[54] APPARATUS FOR IDENTIFYING TOOLS AND FOR MANAGING TOOL DATA

[75] Inventors: Koichi Tsujino, Kyoto; Hiroyuki Yamada, Suita, both of Japan

[73] Assignee: Omron Tateisi Electronics, Kyoto, Japan

[21] Appl. No.: 22,619

[22] Filed: Feb. 17, 1993

Related U.S. Application Data

[63] Continuation of Ser. No. 700,051, Nov. 8, 1988, abandoned, which is a continuation of Ser. No. 904,483, Sep. 8, 1986, abandoned.

[30] Foreign Application Priority Data

Sep. 11, 1985 [JP] Japan ............... 60-200980
Sep. 11, 1985 [JP] Japan ............... 60-200981

[51] Int. Cl.$^5$ ............... G06F 15/46; G05B 23/00
[52] U.S. Cl. ............... 364/474.02; 235/375; 340/680; 340/825.23; 364/474.21; 364/474.37; 483/4; 483/9
[58] Field of Search ............ 364/474.02, 474.21, 364/474.37, 468, 478; 235/375, 385; 318/16; 340/680, 825.06, 825.15, 825.22, 825.23, 825.52, 825.54, 825.72, 870.29, 870.39; 279/9.1, 19.4, 126, 900, 905; 483/4-11

[56] References Cited

U.S. PATENT DOCUMENTS

| | | | |
|---|---|---|---|
| 3,858,892 | 1/1975 | Rutschke | 33/626 X |
| 4,118,871 | 10/1978 | Kirkham | 318/574 |
| 4,236,086 | 11/1980 | Hoebel | 307/149 |
| 4,443,021 | 4/1984 | Buchholz et al. | 279/111 X |
| 4,533,823 | 8/1985 | Vittorio | 364/478 |
| 4,588,880 | 5/1986 | Hesser | 364/478 |
| 4,693,110 | 9/1987 | Juengel | 364/474 |
| 4,742,470 | 5/1988 | Juengel | 340/825.23 |
| 4,807,140 | 2/1989 | Saulnier | 364/478 X |

FOREIGN PATENT DOCUMENTS

| | | |
|---|---|---|
| 132528 | 2/1985 | European Pat. Off. . |
| 155662 | 9/1985 | European Pat. Off. . |
| 3331694 | 3/1985 | Fed. Rep. of Germany . |
| 3410410 | 9/1985 | Fed. Rep. of Germany . |
| 3242551 | 5/1993 | Fed. Rep. of Germany . |
| 4860689 | 5/1948 | Japan . |
| 55-173001 | 2/1955 | Japan . |
| 55-36798 | 3/1980 | Japan . |
| 60-25679 | 2/1985 | Japan . |
| 60-56274 | 10/1985 | Japan . |

OTHER PUBLICATIONS

Industrie-Anzeiger No. 68/69 of Aug. 26, 1981.

*Primary Examiner*—Joseph Ruggiero
*Attorney, Agent, or Firm*—Dickstein, Shapiro & Morin

[57] ABSTRACT

In a machine tool such as a machining center or the like having an automatic tool changing apparatus, the tool holders adapted to respectively hold the tools provided for the automatic tool change are equipped with transmitters for transmitting signals indicative of tool data including the tool discrimination data of the tools. The receiver which receives the transmitted signals from the transmitters is attached to the machine tool. When a transmitter approaches the receiver, the transmitted data is received by the receiver. The kind and other data concerning the tool stored in the tool holder to which a transmitter is attached can be discriminated by the control unit of the machine tool on the basis of the received data.

19 Claims, 5 Drawing Sheets

APPARATUS FOR IDENTIFYING TOOLS AND FOR MANAGING TOOL DATA

This application is a continuation of application Ser. No. 07/700,051 filed Nov. 8, 1988, abandoned, which is a continuation of application Ser. No. 06/904,483 filed Sep. 8, 1986, now abandoned.

BACKGROUND OF THE INVENTION

1. Field of the Invention

The present invention relates to an apparatus for identifying tools and for managing tool data and, more particularly, to a tool identifying (or discriminating) apparatus which is used in machine tools such as machining center and the like having an automatic tool changing (or exchanging) apparatus and used to discriminate the kinds of tools held in each of tool holders and also to a tool data managing apparatus for storing various data regarding the tools and for managing the tools.

2. Prior Art Statement

In a conventional machining center having an automatic tool changing apparatus, a number of tools are respectively fixed to the tool shanks (tool holders) and held in the tool magazine or tool pot (tool keeping or accommodating means) provided in the machining center. When exchanging the tools in accordance with the machining of a workpiece, the tool magazine is rotated and when a desired tool shank reaches the position to change the tools, the rotation of the tool magazine is stopped. The tool fixed to the spindle (main shaft) of the machining center is removed together with its tool shank. Then, the new (desired) tool shank is taken out from the tool magazine by the exchanging arm to insert it into and fix to the spindle of the machining center and the machining is continued. Therefore, prior to using the machine tool, the data regarding the tools such as the kinds of tools supported in the tool magazine, the diameters of tools (for example, drill diameters), the lengths of tools (e.g., drill lengths), the offset amounts of tools, and the like needs to be previously stored into the memory of the control unit of the machine tool by use of the data input apparatus.

The above conventional machine tool has the disadvantage such that it takes a long time to input the data concerned with the tools. There is also the problem such that if the data was erroneously input or the tool shank was inserted to the improper position of the tool magazine, in the case of taking out the tool shank at that wrong position and performing the work, a desired work cannot be executed. On the other hand, in the case of machining in accordance with the numerical control program, the machining position is corrected for every tool by use of the offset amount and the like. However, there is the problem such that each time the tool of the tool shank is changed, the correction value needs to be input into the numerical control unit.

Further, as ways for managing the tool shanks in machine tools, the fixed address system and the variable address system are known. Namely, in the fixed address system, each tool shank is kept at a predetermined position peculiar to each tool shank in the tool magazine. In the variable address system, the control unit of the machine tool stores the keeping position in the tool magazine in connection with each tool shank, thereby enabling each tool shank to be held at an arbitrary position of the tool magazine. When a number of tool shanks are supported in the tool magazine, it is preferable to use the latter system in which in order to promptly exchange the tools, the tool shanks are not fixedly concerned with the keeping positions of the tool magazine in a one-to-one corresponding manner, but the positions of the tool shanks are stored in connection with the kinds of tools in the memory of the control unit of the machine tool.

However, in the case of managing the tool shanks by such system, there is the problem such that the constitution of the apparatus becomes complicated since the backup of the memory and the like are necessary. There is also the problems such that if the tool data which has once been stored is erased due to some reasons, the tool data must be input again. Further, if the sensor to detect the movement of the tool magazine erroneously detects it or if the apparatus to rotate the tool shanks erroneously operates, there will be the risk such that the tool shank of the tool different from the designated tool is taken out of the tool magazine and the machining is performed by the improper tool.

Moreover, in a large-scale machining center and the like, in order to manage the lifetime of each tool, the use time of each tool is measured by the numerical control unit and the tools which have reached the lifetimes are automatically changed. In this case as well, there is also the disadvantage such that when the tool (tool shank) is taken out of the tool pot, the use time of the tool until now needs to be recorded on a record note and the like and when it is again inserted into the tool magazine, the use time of this tool must be reinput into the control unit.

SUMMARY OF THE INVENTION

It is an object of the present invention to provide a reading apparatus which can easily read the kind of tool supported by each tool shank, thereby enabling the control unit of the machine tool to identify or discriminate the kind of tool.

Another object of the present invention is to provide a tool data managing apparatus in which various data regarding the tools such as not only the kinds of tools but also the lengths of tools, diameters of tools, offset amounts of tools, and the like is previously registered and stored in the tools themselves, thereby enabling the tool data to be easily read out and managed.

According to the present invention, there is provided a tool identifying apparatus for use in a machine tool having an automatic tool changing apparatus in which a plurality of tool holders to which the tools are respectively fixed are held in tool keeping means and which automatically exchanges the tool attached to the spindle of the machine tool for a desired tool in the tool keeping means. The tool identifying apparatus comprises: transmitting means which serves as a transmitter provided for each of the tool holders, and which has data setting means for setting tool data including tool discrimination data indicative of the kind of tool which is held in this tool holder, and which transmits a signal representative of the tool data; and receiving means, fixed to the machine tool, for receiving the signal which is transmitted from the transmitting means when the transmitting means approaches the receiving means and thereby discriminating at least the kind of the tool.

According to the present invention, the transmitting means is provided for each tool holder (tool shank) and the signal indicative of different discrimination data is transmitted for every tool supported in the tool holder.

On the side of the receiving means fixed to the machine tool, the transmitted signal is received and the tool discrimination data can be obtained, so that each tool can be discriminated. The tool keeping means (tool magazine) is rotatably disposed and can keep or hold a number of tools held on tool holders. The receiving means is arranged, for example, at a corresponding position to a predetermined rotational angle of the tool keeping means so as to face the transmitting means attached to the tool holder brought at the position of this rotational angle. With this constitution, it is sufficient for the operator to merely insert the tool holder having a desired tool to an arbitrary position in the tool magazine of the machine tool. Thereafter, by rotating the tool magazine by the control unit of the machine tool, the kinds of tools held in the tool magazine can be sequentially detected by the control unit through the transmitting means and receiving means and stored into the memory of the control unit. After completion of this data storage, the machining can be sequentially executed without any error by selecting the proper tools on the basis of the data indicative of the tool kind which has been stored in the memory and by performing a predetermined work in correspondence to the selected tool. In addition, even if the power supply is turned off to stop the works and the like and the data stored in the memory of the control unit is extinguished, the discrimination data of the tools can be restored by obtaining the signal from each transmitting means by rotating the tool magazine again. Therefore, there is no need to keep each tool holder at a predetermined position in the tool magazine. The tool holder can be held at an arbitrary position where the tools can be promptly changed.

The receiving means may be also arranged at a predetermined position on the path along which the tool to be changed will be carried in the automatic tool changing apparatus. With this constitution, the tool of the tool holder selected for changing can be reconfirmed. Therefore, even if the rotation sensor of the tool magazine malfunctions, the execution of the machining by the improper tool can be also prevented.

As well as the data indicative of the kinds of tools, in the case where other various kinds of data concerned with the tools such as lengths of tools, diameters of tools, offset amounts, use times, lifetimes of tools, frictional amounts of tools and the like are preliminarily stored in the data setting means included in the transmitting means, there is no need to store the data necessary for the numerical control into the memory of the control unit of the machine tool for every tool previously by manuary inputting.

If the transmitting means has the receiving function and the receiving means has the transmitting function, respectively, the various data can be also written or registered into the data setting means of each tool from the control unit.

The above and other objects, features and advantages of the present invention will be more apparent from the following detailed description in conjunction with the accompanying drawings.

DESCRIPTION OF THE PREFERRED EMBODIMENTS

Figure 1:
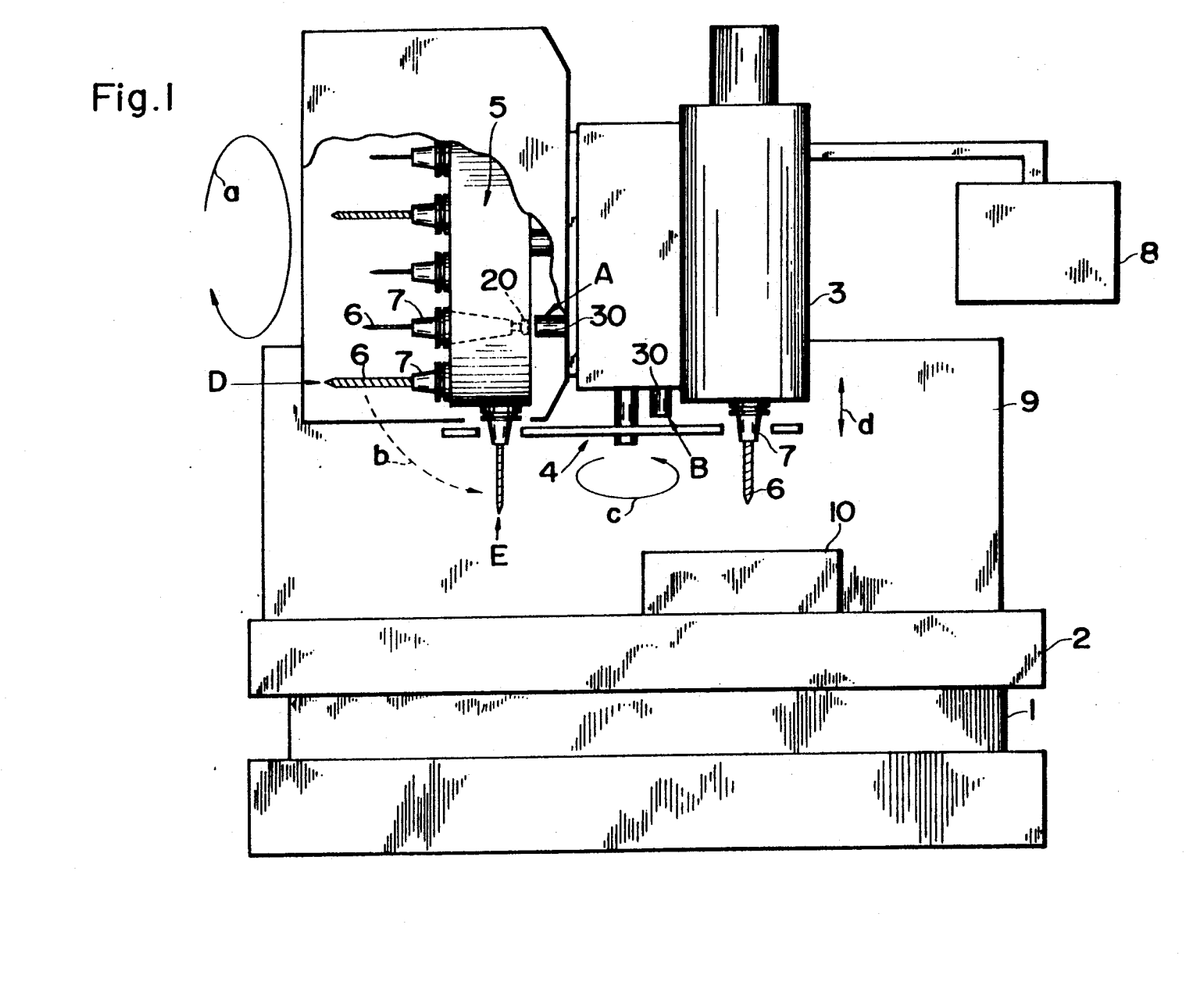
FIG. 1 is a side elevational diagram with a part cut away illustrating an outline of a constitution of a machining center.

FIG. 1 schematically shows an example of a machining center.

An XY table 2 is mounted on a base 1 so as to be movable in the horizontal directions of X and Y. A spindle (main shaft) 3 for machining a workpiece 10 set on the XY table 2, tool magazine 5, and automatic tool changing apparatus 4 are respectively disposed over the XY table 2 by a supporting member 9. Further, a control unit 8 to control the operation of the machining center is suspended by a supporting arm.

The tool magazine 5 detachably supports a number of (for example, tens of) tool shanks 7 and is rotated in the vertical plane in the direction as indicated by an arrow a under control of the control unit 8. Various kinds of tools 6 are supported to the tool shanks 7, respectively.

By rotating the magazine 5, a desired tool 6 is rotated to the position indicated by an arrow D. When the tool 6 has reached to the position of the arrow D, the tool 6 is then rotated counterclockwise by 90° as shown by an arrow b until the position indicated by E. The tool changing apparatus 4 has an exchanging arm adapted to rotate in the horizontal plane as shown by an arrow c and exchanges the tool 6 (tool shank 7) attached to the spindle 3 for the tool 6 (tool shank 7) arranged at the position E under control of the control unit 8. The spindle 3 is vertically movable in the direction as indicated by an arrow d.

As will be explained in detail hereinbelow, the discrimination data (indicative of the kind) of each tool is held in a transmitter 20. This transmitter 20 is attached to the end position of the each tool shank 7. The signal from the transmitter 20 is received by a receiver 30. It is desirable to arrange the receiver 30 at locations near the tool magazine 5 and/or tool changing apparatus 4 as indicated by arrows A and B. At the position indicated by the arrow A, the transmitter 20 of the tool shank 7 kept in the rotary magazine 5 faces the receiver 30 when the shank 7 reaches a predetermined angular position. The rotational angle of the magazine 5 is controlled by the control unit 8. If the signals transmitted from the transmitters 20 of the tool shanks 7 are sequentially received by the receiver 30 at the position A while rotating the magazine 5, the discrimination data of all tools 6 kept in the magazine 5 can be recognized in connection with the keeping positions of the magazine 5.

On the other hand, the position indicated by the arrow B is located on the path along which the tool 6 at the position E is carried to the spindle 3 by the tool changing apparatus 4. Therefore, the transmitter 20 faces the receiver 30 at the position B and the discrimination data is transmitted and received while the selected tool 6 is carried to the spindle 3. Thus, it is possible to check whether the tool 6 to be selected and exchanged is the desired proper tool or not on the basis of the reception data of the receiver 30.

Figure 2:
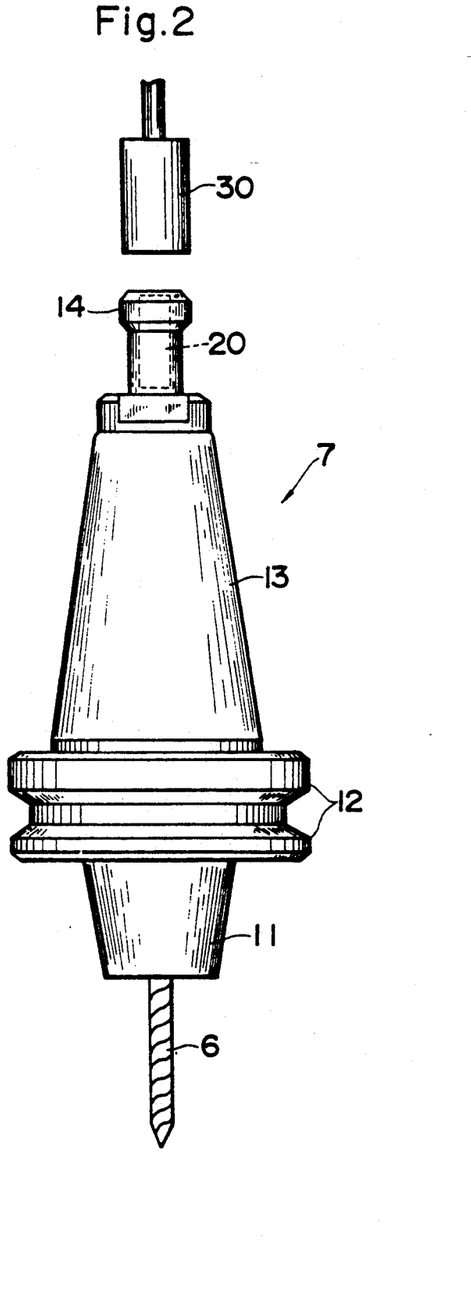
FIG. 2 shows a tool shank into which a transmitter of a tool identifying apparatus is built and a receiver which faces the tool shank.

FIG. 2 shows an example of the tool shank 7. The tool shank 7 has a tapered cylindrical portion 13. Orientation rings 12 are formed on one end of the cylindrical portion 13. The automatic tool changing apparatus 4 supports the whole tool shank 7 by use of the groove between the rings 12. The tool 6 which is peculiar to each tool shank 7, for example, the drill as shown in FIG. 2 is fixed to the tool shank 7 by a chuck 11. A pull stud 14 is attached to the other end of the tool shank 7 in order to hold or take out the tool shank into or from the tool magazine 5.

Figure 3:
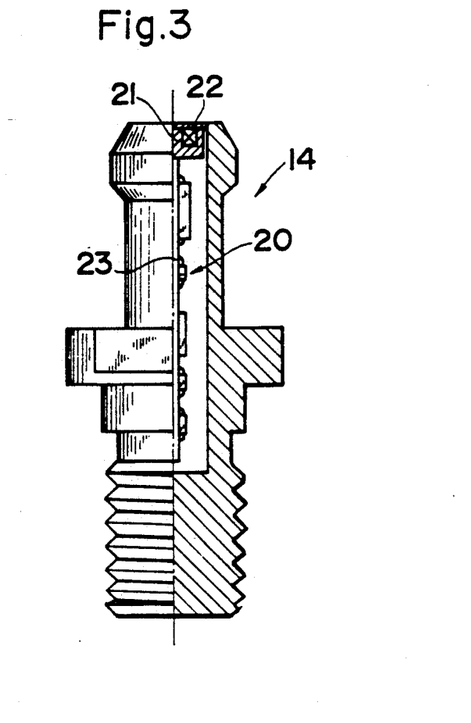
FIG. 3 is a partial cross sectional diagram of a pull stud attached at the top of the tool shank into which the transmitter is buried.

A transmitter 20 is accommodated in the pull stud 14. The transmitter 20 transmits the signal which is peculiar to each tool 6 supported to the tool shank 7. FIG. 3 is a partial cross sectional view of the pull stud 14. A screw groove is formed in the lower portion of the pull stud 14 such that the pull stud can be screwed into the cylindrical portion 13 of the tool shank 7. The transmitter 20 is buried into the upper portion of the pull stud 14. In the upper portion of the transmitter 20, a coil 22 is arranged in a core 21 formed with an annular groove. An electronic circuit, which will be explained hereinafter, is installed on a printed circuit board 23 in the pull stud 14.

Figure 4:
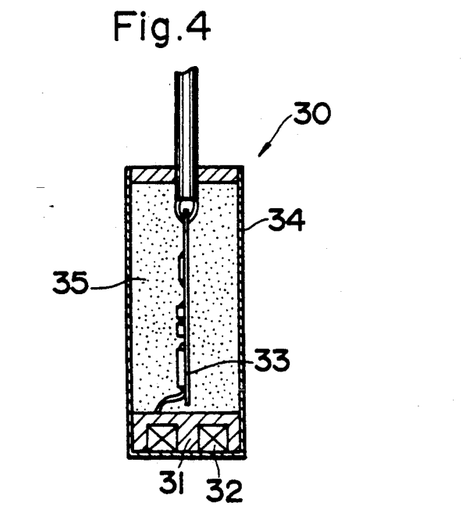
FIG. 4 is a cross sectional view of the receiver.

FIG. 4 is a cross sectional view showing a structure of the receiver 30. In the diagram, in the receiver 30, a coil 32 is attached in a core 31 having an annular groove in the lower portion of a casing 34 similarly to the transmitter 20. An electronic circuit, which will be explained hereinafter, is installed on a printed circuit board 33 in the casing 34. The casing 34 is filled with a filler material 35.

Figure 5:
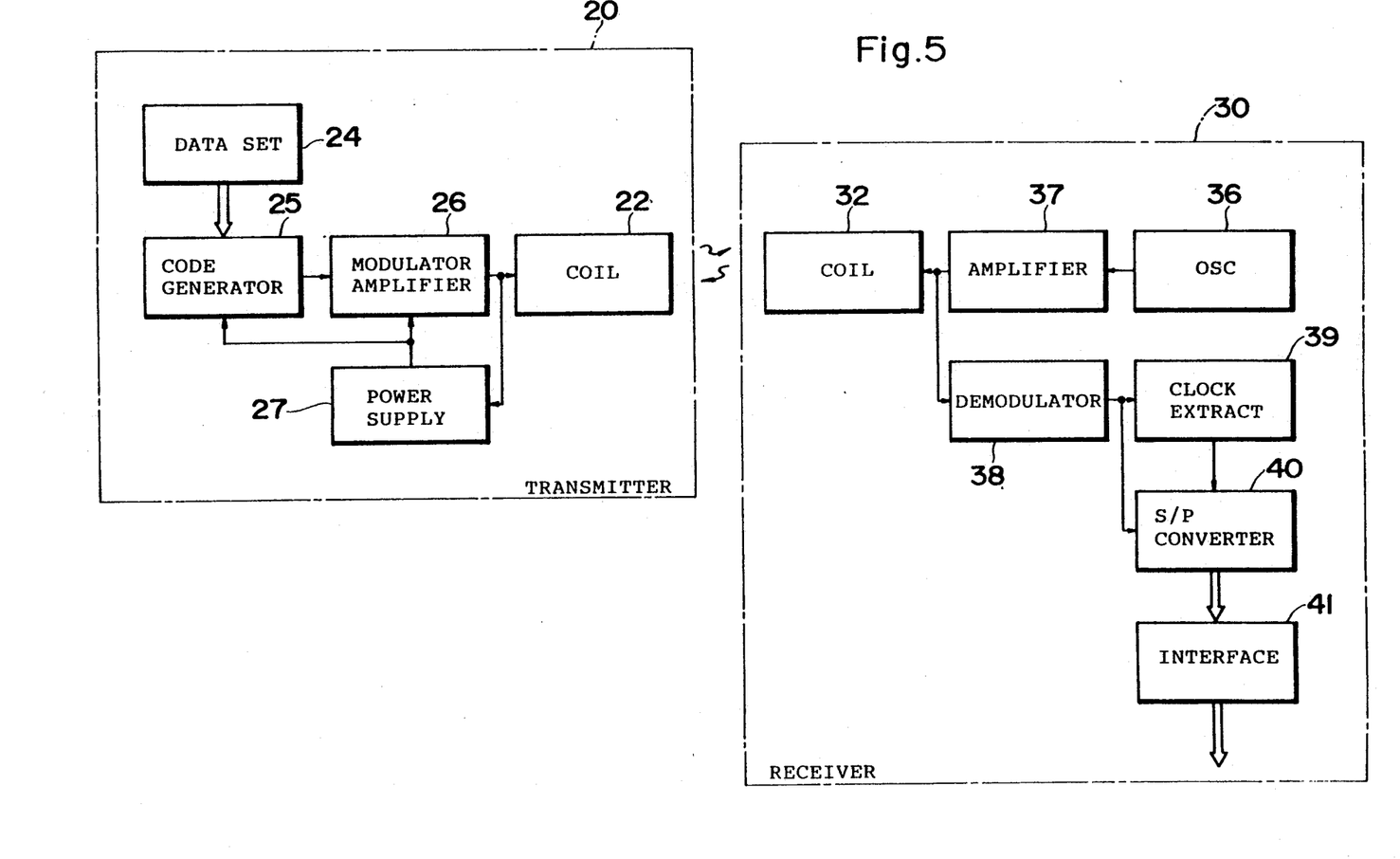
FIG. 5 is a block diagram showing electrical arrangements of the transmitter and receiver of the tool identifying apparatus.

FIG. 5 is a block diagram showing electrical arrangements of the transmitter 20 and receiver 30 of the tool identifying apparatus. In the diagram, the transmitter 20 has a data setting device 24 to set the discrimination data indicative of the kinds of tools 6 (including identification Nos. of the tools, if necessary) held to the tool shanks 7. The parallel data set by the data setting device 24 is supplied to a code generator 25. The data setting device 24 consists of, for example, a plurality of dip switches or non-volatile memory. The code generator 25 converts the parallel data of the data setting device 24 into the serial data by a predetermined clock pulse. The output of the code generator 25 is supplied to a modulation and high frequency amplifier 26. The modulation and high frequency amplifier 26 frequency modulates the input data by, for example, a frequency shift keying (FSK) or the like and amplifies it. The output of the modulation and high frequency amplifier 26 is supplied to the coil 22. The coil 22 transfers the modulated signal to the coil 32 due to the electromagnetic coupling between the coil 22 and the coil 32 of the receiver 30 and also receives the electromagnetic energy which is supplied from the coil 32. The received electromagnetic energy is sent to a power supply circuit 27. The power supply circuit 27 rectifies and regulates the AC voltage which is induced on the coil 22 by the electromagnetic induction and supplies the power source of a predetermined voltage to each section of the transmitter 20. The high frequency for signal transmission to be used in the transmitter 20 is made different from the frequency for power supply of an oscillator 36, which will be explained hereinafter, of the receiver 30, thereby preventing the mutual interference.

On the other hand, the receiver 30 has the oscillator 36 to supply the electric power to the transmitter 20. The oscillation signal of the oscillator 36 is supplied to the coil 32 through an amplifier 37.

A demodulator 38 is connected to the coil 32. The demodulator 38 demodulates the high frequency signal received by the coil 32 and supplies the demodulated output to a clock extracting circuit 39 and a serial/parallel (S/P) converter 40. The clock extracting circuit 39 extracts the clock signal which is generated from the code generator 25 and supplies the clock signal to the S/P converter 40. The S/P converter 40 converts the demodulated serial data on the basis of the clock signal into the parallel data, thereby converting into the parallel data set by the data setting device 24. The converter 40 then supplies the parallel data to an interface 41. The interface 41 transfers the parallel data to the control unit 8.

When the receiver 30 and transmitter 20 are moved to the positions where their coils 32 and 22 face as mentioned above, they are electromagnetically coupled. Thus, the electric power is supplied from the receiver 30 to the transmitter 20 through the coils 32 and 22 and at the same time, the receiver 30 receives the high frequency signal including the tool discrimination data from the transmitter 20.

The operation of the embodiment will now be described. The operator preliminarily inserts the tool shanks 7 which support predetermined tools into the tool magazine 5 as illustrated in FIG. 1. In order to store discrimination data into the memory of the control unit 8, the tool magazine 5 is rotated. When the transmitter 20 of the tool shank 7 disposed at the first position reaches the position where the transmitter 20 faces the receiver 30 attached at the position of A, the electromagnetic coupling is formed between the coil 32 of the receiver 30 and coil 22 of the transmitter 20. Thus, the signal of the frequency for power supply is transferred to the power supply circuit 27 of the transmitter 20 through the coils 32 and 22 and the electric power is supplied to each section of the transmitter 20 from the power supply circuit 27. So long as the power source is supplied, the transmitter 20 continuously operates and the parallel data of the data setting device 24 is converted into the serial data in the code generator 25. The signal peculiar to the tool shank is FSK modulated and transferred to the receiver 30 through the coils 22 and 32. In the receiver 30, the received signal is demodulated by the demodulator 38 and the signal obtained from the transmitter 20 is converted into the parallel data by the clock extracting circuit 39 and S/P converter 40. The parallel data is transmitted to the control unit 8 through the interface 41. In correspondence to the position of the rotational angle of the tool magazine 5 (the rotation of the tool magazine 5 is also controlled by the control unit 8), the control unit 8 stores the received data, namely, the data indicative of the kind of tool 6 held to the tool shank 7 attached at that position of the rotational angle is stored into the memory.

Subsequently, the tool magazine 5 is rotated to move the tool shank 7 adjacent to the first tool shank to the position A. Thus, the electromagnetic coupling is formed between the transmitter 20 of the tool shank 7 and the receiver 30 and the tool data of the tool shank 7 is similarly transmitted to the control unit 8. As described above, before the machining center starts operating, the tool magazine 5 is rotated once and the kinds of the tools held to all of the tool shanks 7 are identified by way of the receiver 30 arranged at the position A. The tool data is stored into the memory of the control unit 8 in correspondence to the rotational angular positions of the tool magazine 5.

Therefore, in the machining of the workpiece 10 by the machining center which will be executed after the above tool identifying process, a desired tool is taken out of the tool magazine 5 on the basis of the data stored in the memory and can be attached to the spindle 3. Further, the tool to be carried to the spindle 3 by the tool changing apparatus 4 is checked by the receiver 30 arranged at the position B to see if it is the designated proper tool or not. Therefore, it is possible to prevent that the workpiece is erroneously worked by use of the improper tool.

In the embodiment, the power source is supplied to the transmitter in the tool shank by the electromagnetic coupling between the transmitter and the receiver so as to transmit the signal only when the transmitter faces the receiver without using any power source for the transmitter. However, it is also possible to provide a power source such as a battery or the like in the transmitter and to transmit the signal indicative of the tool discrimination data when the transmitter faces the receiver.

In addition, in the embodiment, the signal is transmitted by the electromagnetic coupling between the transmitter and the receiver. However, the apparatus can be also constituted in a manner such that a light emitting circuit adapted to emit the light modulated by a predetermined code is provided for the transmitter of each tool shank and a light receiving circuit adapted to receive the emitted light is provided as the receiver, and thereby to transmit the tool discrimination data by the optical signal.

In the above embodiment, only the discrimination data of the tool to which the transmitter is attached is set to this transmitter. However, in addition to this data, other data such as, for example, the lengths of tools, diameters of tools, offset amounts, use times, lifetimes, frictional amounts, and the like (these data is generally referred to as tool data) may be also set to the data setting device 24 of the transmitter 20. It is desirable that the tool data can be written or changed by the receiver 30.

Figure 6:
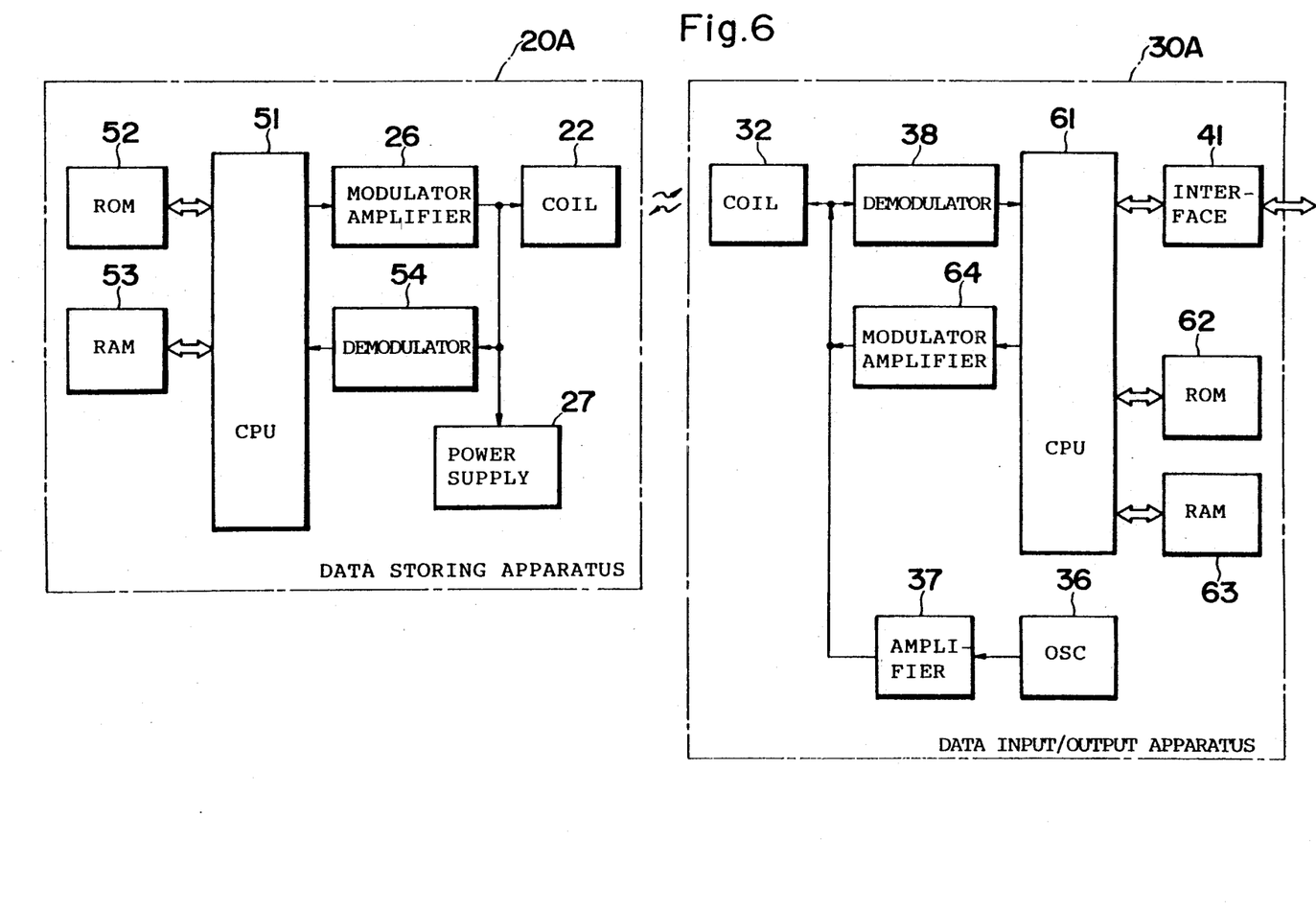
FIG. 6 is a block diagram showing electrical arrangements of a data storing apparatus and a data input/output apparatus of a tool data managing apparatus.

FIG. 6 shows an embodiment in which the tool data is set to a transmitter and the tool data can be further rewritten by a receiver. In FIG. 6, the transmitter is called a data storing apparatus and the receiver is called a data input/output apparatus and these apparatuses are designated by reference numerals 20A and 30A, respectively. In addition, in FIG. 6, the same parts and components as those shown in FIG. 5 are designated by the same reference numerals.

In FIG. 6, the data storing apparatus 20A has therein a central processing unit (hereinafter, abbreviated to a CPU) 51. A read only memory (hereinafter, abbreviated to an ROM) 52 and a random access memory (hereinafter, abbreviated to an RAM) 53 are connected as memory means to the CPU 51. The RAM 53 is used to store the tool data. For instance, the non-volatile RAM having a lithium battery therein or the RAM which is backed up by a battery can be used as the RAM 53. Further, the electrically erasable/programmable ROM (EEPROM) can be also used as the RAM 53. The CPU 51 may be a processor into which and from which the serial data can be input or output. A demodulator 54 is connected to the data input terminal of the CPU 51 and the modulation and high frequency amplifier 26 is connected to the output terminal thereof. The input side of the demodulator 54 and the output side of the modulation and high frequency amplifier 26 are connected to the coil 22. The demodulator 54 demodulates the high frequency signal derived from the coil 22 and transfers the demodulated signal to the CPU 51. The modulation and high frequency amplifier 26 modulates the data derived from the CPU 51 by a predetermined frequency and amplifies the modulated signal and transfers it to the coil 22.

On the other hand, in the data input/output (I/O) apparatus 30A, the demodulator 38 and a modulation and high frequency amplifier 64 are connected to the coil 32. The demodulator 28 demodulates the high frequency signal received by the coil 32 and supplies the demodulated output to a CPU 61. The modulation and high frequency amplifier 64 modulates the signal supplied from the CPU 61 and amplifies the modulated signal and transmits it to the data storing apparatus 20A through the coil 32. An ROM 62 and an RAM 63 are connected to the CPU 61. Further, the interface 41 with the control unit 8 is provided as the output means.

When the data storing apparatus 20A moves to the data I/O apparatus 30A and their coils 22 and 32 face, the coils are electromagnetically coupled. Thus, the electric power is supplied from the data I/O apparatus 30A to the data storing apparatus 20A and at the same time, the data is transmitted and received by way of the high frequency signal. In other words, the data transmitted from the apparatus 30A is received by the apparatus 20A, while the data transmitted from the apparatus 20A is received by the apparatus 30A. In this manner, the bidirectional data transmission is performed. It is desirable that the frequencies of the signals which are transmitted from the apparatuses 20A and 30A are different from each other.

Figure 7:
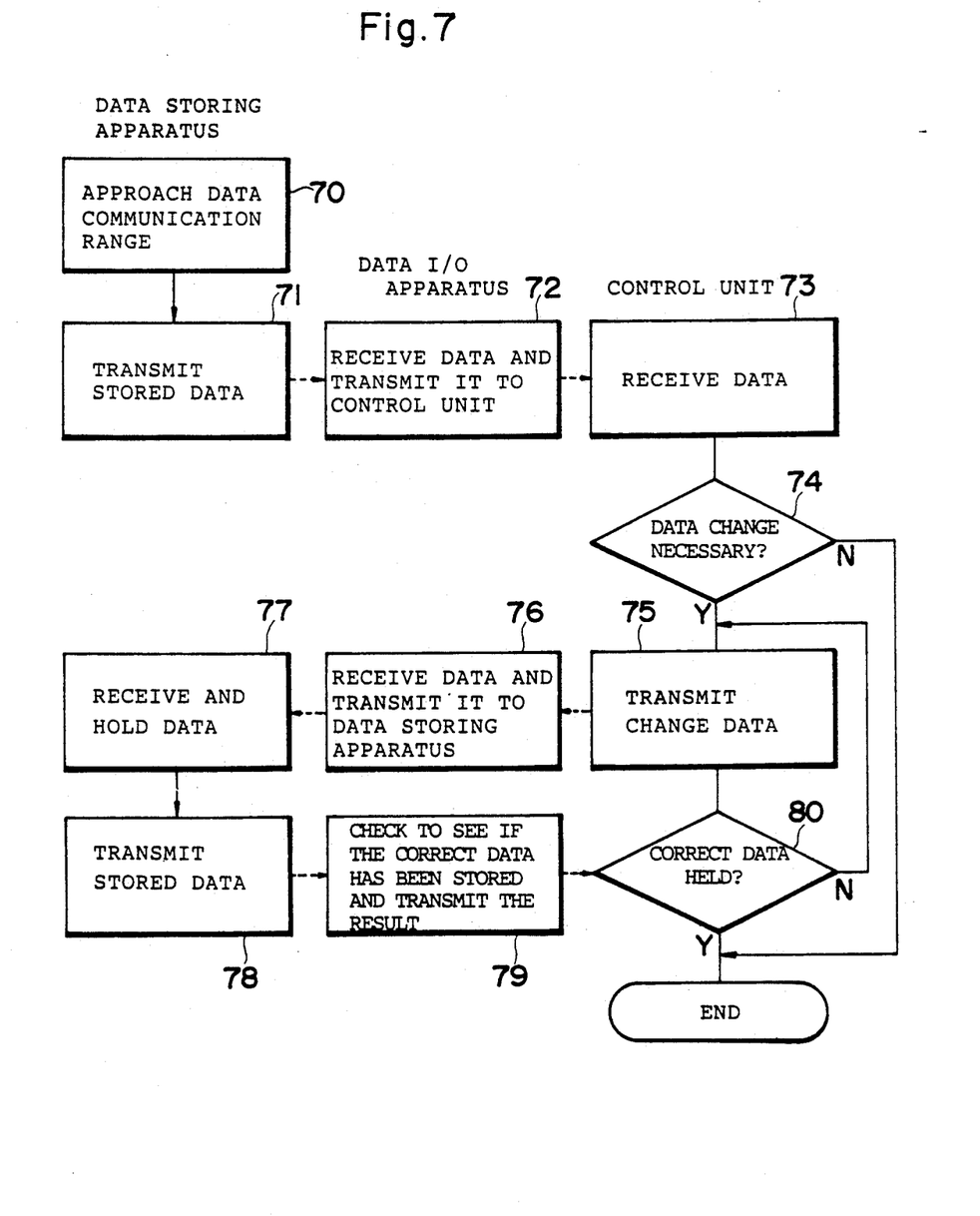
FIG. 7 is a flowchart showing an outline of the operations of data storing apparatus, data input/output apparatus, and control unit.

The data storing apparatus 20A is attached to the tool shank 7. The data I/O apparatus 30A is fixed at the position A or B. The operation of the data managing apparatus consisting of the data I/O apparatus arranged at the position A and the data storing apparatus of each tool shank will now be described hereinbelow. FIG. 7 shows the operations of the data storing apparatus 20A, data I/O apparatus 30A, and control unit 8. These operations relate to the process to change the tool data which is executed before a tool is changed, or after the tool was changed, or before the operation of the machining center is started, or after the operation of the machining center was finished. It is assumed that the tool data including the tool discrimination data has previously been stored in the RAM 53 of the data storing apparatus 20A, and at least the tool discrimination data of each of tools 6 kept on the magazine 5 has been stored in the memory of the control unit 8 in connection with their angular position of the magazine 5 in a similar manner to the process in the foregoing embodiment. The changing processes of the tool data denote that the process to prolong the use times of the tools in the tool data, the process to write the result such that the tool was determined to be improper by the tool validity sensor into the tool, and the like are executed.

When the tool magazine 5 is rotated and the desired tool shank 7 is set at the position corresponding to the position A, the coil 32 of the data I/O apparatus 30A is electromagnetically coupled with the coil 22 of the data storing apparatus 20A. Thus, the signal of the frequency for power supply from the oscillator 36 of the data I/O apparatus 30A is transmitted to the power supply circuit 27 of the data storing apparatus 20A through the coils 32 and 22. The electric power is supplied from the power supply circuit 27 to each section of the apparatus 20A. In this manner, the data can be communicated between the data storing apparatus 20A and the data I/O apparatus 30A (step 70). Then, step 71 follows step 70 and a part of or all of the tool data stored in the RAM 53 is given to the modulation and high frequency amplifier 26 through the CPU 51. This tool data is FSK modulated by the modulation and high frequency amplifier 26 and transmitted to the data I/O apparatus 30A through the coils 22 and 32. In the data I/O apparatus 30A, the received signal is demodulated by the demodulator 38 and the demodulated signal is given to the CPU 61. The CPU 61 transfers this data to the control unit 8 through the interface 41 (step 72). The control unit 8 receives the data (step 73) and discriminates the necessity of the change of data in step 74. If there is no need to change the data, the processing routine is finished. On the contrary, if the data needs to be changed, step 75 follows and the change data is transmitted to the CPU 61 through the interface 41. By the CPU 61 of the data I/O apparatus 30A, the change data is transferred to the modulation and high frequency amplifier 64, by which it is FSK modulated and transmitted to the coil 32 (step 76). Therefore, the signal is transferred to the data storing apparatus 20A by the electromagnetic coupling between the coils 32 and 22. This signal is demodulated to the original signal by the demodulator 54 and given to the CPU 51. The CPU 51 temporarily stores the data transmitted from the control unit 8 as described above into the RAM (step 77). In the next step 78, this data stored in the RAM 53 is transmitted to the data I/O apparatus 30A through the modulation and high frequency amplifier 26. The data I/O apparatus 30A checks to see if the data transmitted in step 76 has been accurately stored in the data storing apparatus 20A or not by comparing the data transmitted in step 76 from the data I/O apparatus 30A with the data transmitted in step 78 from the data storing apparatus 20A, and the result of the discrimination is transferred to the control unit 8 (step 79). If it is decided that the data has been accurately held, the control unit 8 finishes the processes in step 80. If the improper data was stored, the processing routine is returned to step 75. Thus, the change data is again transmitted and the correct data can be finally written into the data storing apparatus 20A through the data I/O apparatus 30A. In this manner, the data in the data storing apparatus 20A in the tool shank 7 can be read out and a predetermined data can be written as necessary.

If necessary, the tool magazine 5 is further rotated until the next tool shank 7 faces the apparatus 30A arranged at the position A, and the similar tool data changing processes are executed.

As described above, after the tool was used, it is possible to perform the processes to rewrite the stored use time of the tool with use of the measured use time and the like, namely, to write or rewrite the data peculiar to the tool into each tool shank which holds the tool. On the basis of these data including new data, the tool data can be managed.

What is claimed is:

1. An apparatus for identifying tools for use in a machine tool having an automatic tool changing apparatus, the automatic tool changing apparatus having tool keeping means for holding a plurality of tool holders to which the tools are respectively fixed, each of said tool holders having an associated pull stud, said tool changing apparatus automatically exchanging a tool attached to a spindle of the machine tool for a desired tool in said tool keeping means, by using the pull stud of the tool holders for the exchanged tools to hold the tools, said tool identifying apparatus comprising:

a plurality of transmitting means respectively provided for each of said tool holders, each of said transmitting means being provided in a respective pull stud of a respective tool holder and having data setting means for setting tool data including tool discrimination data indicative of the kind of tool which is held in said respective tool holder, each said transmitting means transmitting a signal representative of said tool data, each said pull stud being a self-contained unit which is attachable to and detachable from a respective tool holder to permit exchange of a respective transmitting means; and receiving means, fixed to said machine tool, for receiving a signal transmitted from one of said transmitting means when said one transmitting means approaches said receiving means to thereby discriminate at least the kind of tool held by the tool holder associated with said one transmitting means.

2. A tool identifying apparatus according to claim 1, wherein said receiving means is fixed to a predetermined position of said tool keeping means of said machine tool.

3. A tool identifying apparatus according to claim 1, wherein said receiving means is fixed to a predetermined position in said automatic tool changing apparatus.

4. A tool identifying apparatus according to claim 1, wherein each said transmitting means has a coil and said receiving means has a coil and each said transmitting means is electromagnetically coupled to said receiving means when each said transmitting means approaches said receiving means.

5. A tool identifying apparatus according to claim 4, wherein said receiving means has means for supplying operating electric power to each of said transmitting means through electromagnetic coupling of a coil of a transmitting means with the coil of said receiving means.

6. A tool identifying apparatus according to claim 1, wherein each said transmitting means has a receiving function, said receiving means has a transmitting function, and said data setting means of an associated transmitting means holds data transmitted from the receiving means to said associated transmitting means.

7. An apparatus for managing tool data for use in a machine tool having an automatic tool changing apparatus, the automatic tool changing apparatus having tool keeping means for holding a plurality of tool holders to which the tools are respectively fixed, each of said tool holders having an associated pull stud, said tool changing apparatus automatically exchanging the tool attached to a spindle of the machine tool for a desired tool in said tool keeping means by using the pull stud of the tool holders for the exchanged tools to hold the tools, said tool data managing apparatus comprising:

(A) a data storing apparatus respectively provided for each of said plurality of tool holders, said data storing apparatus, for each tool holder, being provided in a respective pull stud which is provided as a self-contained unit and is attachable to and detachable from one end of the tool holder and having:
  (i) holding means for holding tool data concerning a respective tool holder,
  (ii) first transmitting/receiving means for transmitting and receiving data, and
  (iii) control means for allowing data held in said holding means to be transmitting to said first transmitting/receiving means and for allowing data received by the first transmitting/receiving means to be stored into said holding means; and
(B) a data input/output apparatus fixed to said machine tool and having:
  (i) second transmitting/receiving means for transmitting and receiving data to and from a said first transmitting/receiving means when a said first transmitting/receiving means approaches said second transmitting/receiving means,
  (ii) output means for outputting the data received by said second transmitting/receiving means, and
  (iii) input means for transferring input data to said second transmitting/receiving means.

8. A tool data managing apparatus according to claim 7, wherein said data input/output apparatus is fixed to a predetermined position in said tool keeping means of said machine tool.

9. A tool data managing apparatus according to claim 7, wherein said data input/output apparatus is fixed to a predetermined position in said automatic tool changing apparatus.

10. A tool data managing apparatus according to claim 7, wherein said first transmitting/receiving means in said data storing apparatus of a respective tool holder and said second transmitting/receiving means in said data input/output apparatus respectively have coils adapted to face each other when said first and second transmitting/receiving means approach each other, thereby bidirectionally transmitting the data by electromagnetic coupling of said coils.

11. A tool data managing apparatus according to claim 10, wherein operation electric power of said data storing apparatus is supplied from said data input/output apparatus to said data storing apparatus through the electromagnetic coupling of said coils.

12. An apparatus for identifying tools for use in a machine tool having an automatic tool changing apparatus, the automatic tool changing apparatus having tool keeping means for holding a plurality of tool holders to which the tools are respectively fixed, each of said tool holders having an associated pull stud, said tool changing apparatus automatically exchanging the tool attached to a spindle of the machine tool for a desired tool in said tool keeping means by using the pull stud of the tool holders for the exchanged tools to hold the tools, said tool identifying apparatus comprising:
  a plurality of transmitting means respectively provided for each of said tool holders, each of said transmitting means being provided in a respective pull stud which is provided as a self-contained unit which is attachable to and detachable from a respective tool holder, each of said transmitting means having data setting means for setting tool data including tool discrimination data indicative of the kind of tool which is held in said respective tool holder, each said transmitting means having a respective coil through which a signal representative of tool data is transmitted; and
  receiving means, fixed to said machine tool, and including a coil for receiving, by electromagnetic coupling, signals transmitted from each of said transmitting means when each of said transmitting means approaches said receiving means to thereby discriminate at least the kind of tool held by each of said tool holders.

13. An apparatus for managing tool data for use in a machine tool having an automatic tool changing apparatus, the automatic tool changing apparatus having tool keeping means for holding a plurality of tool holders to which the tools are respectively fixed, each of said tool holders having an associated pull stud, said tool changing apparatus automatically exchanging the tool attached to a spindle of the machine tool for a desired tool in said tool keeping means, by using the pull stud of the tool holders of the exchanged tools to hold the tools, said tool data managing apparatus comprising:
(A) a data storing apparatus respectively provided for each of said plurality of tool holders, said data storing apparatus, for each tool holder, being provided in a respective pull stud attachable to and detachable from one end of the tool holder and having:
  (i) holding means for holding tool data concerning a respective tool holder,
  (ii) first transmitting/receiving means, including a coil, for transmitting and receiving data, and
  (iii) control means for allowing data held in said holding means to be transmitting by said first transmitting/receiving means through said coil and for allowing data received by the first transmitting/receiving means through said coil to be stored into said holding means; and
(B) a data input/output apparatus fixed to said machine tool and having:
  (i) second transmitting/receiving means including a coil, for transmitting and receiving data to and from said first transmitting/receiving means of each tool holder through the coils of said first and second transmitting/receiving means when a said first transmitting/receiving means approaches said second transmitting/receiving means,
  (ii) output means for outputting the data received by said second transmitting/receiving means, and
  (iii) input means for transferring input data to said second transmitting/receiving means.

14. An apparatus for identifying tools for use in a machine tool having an automatic tool changing apparatus, the automatic tool changing apparatus having tool keeping means for holding a plurality of tool holders to which the tools are respectively fixed, each of said tool holders having an associated pull stud, said tool changing apparatus automatically exchanging a tool attached to a spindle of the machine tool for a desired tool in said tool keeping means by using the pull stud of the tool holders of the exchanged tools to hold the tools, said tool identifying apparatus comprising:
  a plurality of transmitting means respectively provided for each of said tool holders, each of said transmitting means being provided in a respective pull stud of a respective tool holder and having data setting means for setting tool data including tool discrimination data indicative of the kind of tool which is held in said respective tool holder, each said transmitting means transmitting a signal representative of said tool data, each said pull stud being a self-contained unit which is attachable to and detachable from a respective tool holder to permit exchange of a respective transmitting means, each said pull stud having a cylindrical exterior shape and containing a threaded portion which is in threaded engagement with said respective tool holder, said threaded engagement enabling said pull stud to be attachable to and detachable from said respective tool holder;

receiving means, fixed to said machine tool, for receiving a signal transmitted from one of said transmitting means when said one transmitting means approaches said receiving means to thereby discriminate at least the kind of tool held by the tool holder associated with said one transmitting means; and each of said transmitting means having a coil and said receiving means having a coil, each of said transmitting means being electromagnetically coupled to said receiving means when each said transmitting means approaches said receiving means, said receiving means having means for supplying operating electric power to each of said transmitting means through the electromagnetic coupling of a coil of a transmitting means with a coil of said receiving means.

15. An apparatus according to claim 14, wherein said tool holders rotate about a longitudinal axis during use of a tool.

16. An apparatus for managing tool data for use in a machine tool having an automatic tool changing apparatus, the automatic tool changing apparatus having tool keeping means for holding a plurality of tool holders to which the tools are respectively fixed, each of said tool holders having an associated pull stud, said tool changing apparatus automatically exchanging the tool attached to a spindle of the machine tool for a desired tool in said tool keeping means by using the pull stud of the tool holders of the exchanged tools to hold the tools, said tool data managing apparatus comprising:

(A) a data storing apparatus respectively provided or each of said plurality of tool holders, said data storing apparatus, for each tool holder, being provided in a respective pull stud which is provided as a self-contained unit and which is attachable to and detachable from one end of the tool holder and having:
 (i) holding means for holding tool data concerning a respective tool holder,
 (ii) first transmitting/receiving means for transmitting and receiving data, and
 (iii) control means for allowing data held in said holding means to be transmitting to said first transmitting/receiving means and for allowing data received by the first transmitting/receiving means to be stored into said holding means; and (B) a data input/output apparatus fixed to said machine tool and having:
 (i) second transmitting/receiving means for transmitting and receiving data to and from a said first transmitting/receiving means when a said first transmitting/receiving means approaches said second transmitting/receiving means,
 (ii) output means for outputting the data received by said second transmitting/receiving means,
 (iii) input means for transferring input data to said second transmitting/receiving means;

(C) wherein said first transmitting/receiving means in said data storing apparatus of a respective tool holder and said second transmitting/receiving means in said data input/output apparatus respectively having coils adapted to face each other when said first and second transmitting/receiving means approach each other, thereby bidirectionally transmitting the data by electromagnetic coupling of said coils; and (D) wherein operation electric power of said data storing apparatus is supplied from said data input/output apparatus to said data storing apparatus through the electromagnetic coupling of said coils.

17. An apparatus according to claim 16, wherein said tool holders rotate about a longitudinal axis during use of a tool.

18. An apparatus according to claim 1, wherein said tool holders rotate about a longitudinal axis during use of a tool.

19. An apparatus according to claim 7, wherein said tool holders rotate about a longitudinal axis during use of a tool.

* * * * *